US010013097B2

(12) United States Patent
Choung et al.

(10) Patent No.: US 10,013,097 B2
(45) Date of Patent: Jul. 3, 2018

(54) TOUCH SCREEN PANEL INCLUDING TOUCH ELECTRODE PATTERNS AND DRIVING CIRCUIT WIRINGS HAVING A LOW RESISTANCE WIRING LAYER AND CONNECTED THERETO AND MANUFACTURING METHOD THEREOF

(71) Applicant: Samsung Display Co., Ltd., Yongin, Gyeonggi-Do (KR)

(72) Inventors: Jong-Hyun Choung, Hwaseong-si (KR); In-Bae Kim, Yongin-si (KR); Hong Sick Park, Suwon-si (KR); Byeong-Jin Lee, Suwon-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 538 days.

(21) Appl. No.: 14/466,673

(22) Filed: Aug. 22, 2014

(65) Prior Publication Data

US 2015/0220202 A1    Aug. 6, 2015

(30) Foreign Application Priority Data

Feb. 5, 2014  (KR) .................. 10-2014-0013233

(51) Int. Cl.
  *G06F 3/045*  (2006.01)
  *G06F 3/041*  (2006.01)
  *G06F 3/044*  (2006.01)
(52) U.S. Cl.
  CPC ............ *G06F 3/0416* (2013.01); *G06F 3/044* (2013.01); *G06F 2203/04103* (2013.01); *G06F 2203/04111* (2013.01)

(58) Field of Classification Search
  CPC ......... G06F 3/0416; G06F 2203/04111; G06F 2203/04103
  (Continued)

(56) References Cited

U.S. PATENT DOCUMENTS

2009/0152542 A1* 6/2009 Lee .................... H01L 22/34
                                                      257/48
2010/0045625 A1* 2/2010 Yang .................. G06F 3/044
                                                     345/173

(Continued)

FOREIGN PATENT DOCUMENTS

KR   10-1121120 B1   2/2012
KR   10-1128669 B1   2/2012
(Continued)

*Primary Examiner* — Jonathan Blancha
(74) *Attorney, Agent, or Firm* — Knobbe, Martens, Olson & Bear, LLP

(57) ABSTRACT

A touch screen panel and manufacturing method thereof are disclosed. In one aspect, the touch screen panel includes a substrate having a touch area and a peripheral area that surrounds the touch area and a plurality of first touch electrode patterns that are formed in the touch area, extend in a first direction, and are configured to transmit a first touch signal. The touch panel also includes a plurality of second touch electrode patterns that are formed in the touch area, extend in a second direction crossing the first direction, and are configured to transmit a second touch signal and a plurality of first driving circuit wirings that are formed in the peripheral area and are respectively electrically connected to the first touch electrode patterns. The first driving circuit wirings include a low resistance wiring layer.

20 Claims, 24 Drawing Sheets

(58) Field of Classification Search
USPC .......................................... 345/174; 216/13
See application file for complete search history.

(56) References Cited

U.S. PATENT DOCUMENTS

| | | | | |
|---|---|---|---|---|
| 2010/0171718 | A1* | 7/2010 | Denda | G06F 3/044 345/173 |
| 2012/0019455 | A1* | 1/2012 | Jin | G06F 3/044 345/173 |
| 2012/0044191 | A1* | 2/2012 | Shin | G06F 3/044 345/174 |
| 2012/0105342 | A1* | 5/2012 | Yu | G06F 3/0412 345/173 |
| 2012/0262385 | A1* | 10/2012 | Kim | G06F 3/044 345/173 |
| 2013/0114013 | A1* | 5/2013 | Park | H01L 27/1225 349/43 |
| 2013/0251943 | A1* | 9/2013 | Pei | H01B 1/02 428/141 |
| 2014/0198266 | A1* | 7/2014 | Park | G02F 1/13338 349/12 |
| 2014/0253495 | A1* | 9/2014 | Kang | G06F 3/044 345/174 |

FOREIGN PATENT DOCUMENTS

| | | |
|---|---|---|
| KR | 10-2012-0072174 A | 7/2012 |
| KR | 10-1228581 B1 | 1/2013 |
| KR | 10-2013-0062579 A | 6/2013 |
| KR | 10-1279599 B1 | 6/2013 |

* cited by examiner

TOUCH SCREEN PANEL INCLUDING TOUCH ELECTRODE PATTERNS AND DRIVING CIRCUIT WIRINGS HAVING A LOW RESISTANCE WIRING LAYER AND CONNECTED THERETO AND MANUFACTURING METHOD THEREOF

INCORPORATION BY REFERENCE TO ANY PRIORITY APPLICATIONS

This application claims priority to and the benefit of Korean Patent Application No. 10-2014-0013233 filed in the Korean Intellectual Property Office on Feb. 5, 2014, the entire contents of which are incorporated herein by reference.

BACKGROUND

Field

The described technology generally relates to a touch screen panel and a manufacturing method thereof.

Description of the Related Technology

Touch screen panels are used as input devices for flat panel displays such as liquid crystal displays (LCDs), organic light-emitting diode (OLED) displays, and the like. Depending on the sensing technology employed, touch screen panels can be classified into resistive and capacitive touch screen panels. In resistive touch screen panels, an electrode is formed on an upper plate or a lower plate and a touch position is determined by a voltage gradient based on resistance when a DC voltage is applied to the electrode. In capacitive touch screen panels, an equipotential is formed in a conductive film and a touch position is determined when a change in voltage of the upper or lower plate occurs due to the touch input operation.

SUMMARY OF CERTAIN INVENTIVE ASPECTS

One inventive aspect is a touch screen panel and a manufacturing method thereof that can selectively etch a connection line without damaging first and second touch electrode patterns as well as improve conductivity of driving circuit wires.

Another aspect is a touch screen panel including a substrate having a touch area and a peripheral area surrounding the touch area; a first touch electrode pattern that is formed on the touch area in a first direction and transmits a first touch signal; a plurality of second touch electrode patterns that are formed on the touch area in a second direction crossing the first direction and transmit a second touch signal; and first driving circuit wiring that is formed on the peripheral area and is connected to the first touch electrode pattern. The first driving circuit wiring may include a low resistance wiring layer.

The plurality of second touch electrode patterns may be spaced apart from each other and a connecting line that interconnects adjacent second touch electrode patterns may be further included.

A touch insulating member that is formed between the first touch electrode pattern and the connecting line to insulate the first touch electrode pattern from the second touch electrode pattern may be further included.

The first driving circuit wiring may include a first transparent conductive wiring layer, a second transparent conductive wiring layer, and a low resistance wiring layer that are sequentially laminated and the first and second touch electrode patterns may respectively include the first and second transparent conductive wiring layers.

The first transparent conductive wiring layer may contain silver nanowire and the second transparent conductive wiring layer and the connecting line may contain a transparent conductive oxide.

The low resistance wiring layer may be formed of one material selected from copper and silver.

An etching rate of the connecting line is higher than that of the second transparent conductive wiring layer.

The connecting line may have a higher indium content than that of the second transparent conductive wiring layer.

An insulating layer and a peripheral insulating member may be sequentially laminated on the first driving circuit wiring and the touch insulating member and the connecting line may be sequentially laminated on a first touch overlapping portion of the first touch electrode pattern that overlaps the connecting line.

The connecting line may contact the second transparent conductive wiring layer of the second touch electrode pattern. The insulating layer may be formed between the first and second touch electrode patterns.

Another aspect is a method of manufacturing a touch screen panel including sequentially forming a first transparent conductive layer, a second transparent conductive layer, a low resistance layer, and a photosensitive film on a substrate having a touch area and a peripheral area that surrounds the touch area; forming a touch photosensitive film pattern in the touch area and a peripheral photosensitive film pattern in the peripheral area; forming a first touch electrode pattern, a second touch electrode pattern, and first driving circuit wiring by using the touch and peripheral photosensitive film patterns as etching masks; exposing the first driving circuit wiring by removing the peripheral photosensitive film layer as well as by reducing a thickness of the touch photosensitive film pattern; forming an insulating layer on the first driving circuit wiring and the touch photosensitive film pattern; exposing the first and second touch electrode patterns by removing the touch photosensitive film pattern and the insulating layer formed thereon; and removing the low resistance layers of the first and second touch electrode patterns.

In the removing the low resistance layers, the first and second touch electrode patterns may be formed by laminating a first transparent conductive wiring layer and a second transparent conductive wiring layer, and the first driving circuit wiring may be formed by laminating a first transparent conductive wiring layer, a second transparent conductive wiring layer, and a low resistance wiring layer.

After removing the low resistance layer, forming a peripheral insulating member on the insulating member and a touch insulating member on the second touch electrode pattern and forming a connecting line on the touch insulating member and the first touch electrode pattern may be further included.

The insulating layer may be formed between the first and second touch electrode patterns.

In removing the touch photosensitive film pattern and the insulating layer formed thereon, the low resistance wiring layers of the first and second touch electrode patterns may be exposed and lateral sides of the first transparent conductive wiring layer of the first and second touch electrode patterns may be covered by the insulating layer.

The peripheral photosensitive film pattern having a smaller thickness than the touch photosensitive film pattern may be formed by using a slit mask.

The first transparent conductive layer may contain silver nanowire, the second transparent conductive layer may contain a transparent conductive oxide, and the low resistance layer is formed of one material selected from copper and silver.

Another aspect is a touch screen panel, comprising a substrate having a touch area and a peripheral area that surrounds the touch area; a plurality of first touch electrode patterns that are formed in the touch area, extend in a first direction, and are configured to transmit a first touch signal; a plurality of second touch electrode patterns that are formed in the touch area, extend in a second direction crossing the first direction, and are configured to transmit a second touch signal; and a plurality of first driving circuit wirings that are formed in the peripheral area and are respectively electrically connected to the first touch electrode patterns, wherein the first driving circuit wirings include a low resistance wiring layer.

The second touch electrode patterns can be spaced apart from each other and the panel can further comprise a plurality of connecting lines electrically connecting the second touch electrode patterns that are adjacent in the second direction. The panel can further comprise a plurality of touch insulating members that are respectively formed between the first touch electrode patterns and the connecting lines and electrically insulate the first touch electrode patterns from the second touch electrode patterns. The first driving circuit wirings can include a first transparent conductive wiring layer, a second transparent conductive wiring layer, and the low resistance wiring layer that are sequentially formed and the first and second touch electrode patterns can respectively include the first and second transparent conductive wiring layers. The first transparent conductive wiring layer can contains silver nanowire and the second transparent conductive wiring layer and the connecting line can contain a transparent conductive oxide. The low resistance wiring layer can be formed of copper or silver. The connecting lines can have an etching rate that is greater than that of the second transparent conductive wiring layer. The connecting lines can have a higher indium content than the second transparent conductive wiring layer. An insulating layer and a peripheral insulating member can be are sequentially laminated on the first driving circuit wirings. The insulating layer can be formed between the first and second touch electrode patterns. The touch insulating members and the connecting lines can be sequentially and respectively formed over first connection portions of the first touch electrode patterns. The connecting lines can contact the second transparent conductive wiring layers of the second touch electrode patterns.

Another aspect is a method of manufacturing a touch screen panel, comprising sequentially forming a first transparent conductive layer, a second transparent conductive layer, a low resistance layer, and a photosensitive film over a substrate, the substrate having a touch area and a peripheral area that surrounds the touch area; forming a touch photosensitive film pattern in the touch area and a peripheral photosensitive film pattern in the peripheral area; etching the first transparent conductive layer, the second transparent conductive layer, and the low resistance layer using the touch and peripheral photosensitive film patterns as etching masks so as to form a first touch electrode pattern, a second touch electrode pattern, and a first driving circuit wiring; performing an ashing process so as to remove the peripheral photosensitive film layer and reduce the thickness of the touch photosensitive film pattern; forming an insulating layer over the first driving circuit wiring and the touch photosensitive film pattern; removing the touch photosensitive film pattern and the insulating layer formed thereon; and removing the low resistance layers of the first and second touch electrode patterns.

Each of the first and second touch electrode patterns can include a first transparent conductive wiring layer and a second transparent conductive wiring layer and the first driving circuit wiring can include a first transparent conductive wiring layer, a second transparent conductive wiring layer, and a low resistance wiring layer. The method can further comprise forming a peripheral insulating member over the insulating layer in the peripheral region and a touch insulating member over the first touch electrode pattern, after removing the low resistance layer; and forming a connecting line over the touch insulating member so as to be electrically connected to the second touch electrode pattern. The insulating layer can be formed between the first and second touch electrode patterns. During the removing the touch photosensitive film pattern, the low resistance wiring layers of the first and second touch electrode patterns can be exposed and lateral sides of the first transparent conductive wiring layer of the first and second touch electrode patterns are covered by the insulating layer. The thickness of the peripheral photosensitive film pattern can be less than that of the touch photosensitive film pattern and the peripheral photosensitive film pattern can be formed by using a slit mask. The first transparent conductive layer can contain silver nanowire, the second transparent conductive layer can contain a transparent conductive oxide, and the low resistance layer can be formed of copper or silver.

Another aspect is a touch screen panel, comprising a substrate having a touch area and a peripheral area surrounding the touch area; a plurality of first touch electrode patterns formed in the touch area and extending in a first direction; a plurality of second touch electrode patterns formed in the touch area and extending in a second direction crossing the first direction, wherein the first and second touch electrode patterns are configured to sense touch input; and a plurality of driving circuit wirings formed in the peripheral area and respectively electrically connected to the first and second touch electrode patterns, wherein the first and second touch electrode patterns and the driving circuit wirings include a first transparent conductive wiring layer and a second transparent conductive wiring layer and wherein the driving circuit wirings further include a low resistance wiring layer.

According to at least one embodiment, the conductivity of the first driving circuit wiring can be improved by forming the first driving circuit wiring including the low resistance wiring layer in the peripheral layer.

Further, when the touch photosensitive film pattern is removed and a lift-off process for removing the insulating layer formed thereon is performed, top surfaces of the first and second touch electrode patterns are protected from the lift-off process because they are covered with the second transparent conductive wiring layer and the low resistance wiring layer, while lateral sides of the first transparent conductive wiring layers of the first and second touch electrode patterns are protected from the lift-off process because they are covered with the insulating layer.

In addition, when an etching rate of the connecting line that interconnects the separated second touch electrode patterns is set higher than that of the second transparent conductive wiring layer, selective etching of the connecting line can be performed without damaging the second transparent conductive wiring that is formed on the first and second touch electrode patterns in a patterning process of the connecting line.

DETAILED DESCRIPTION OF CERTAIN INVENTIVE EMBODIMENTS

Figure 1:
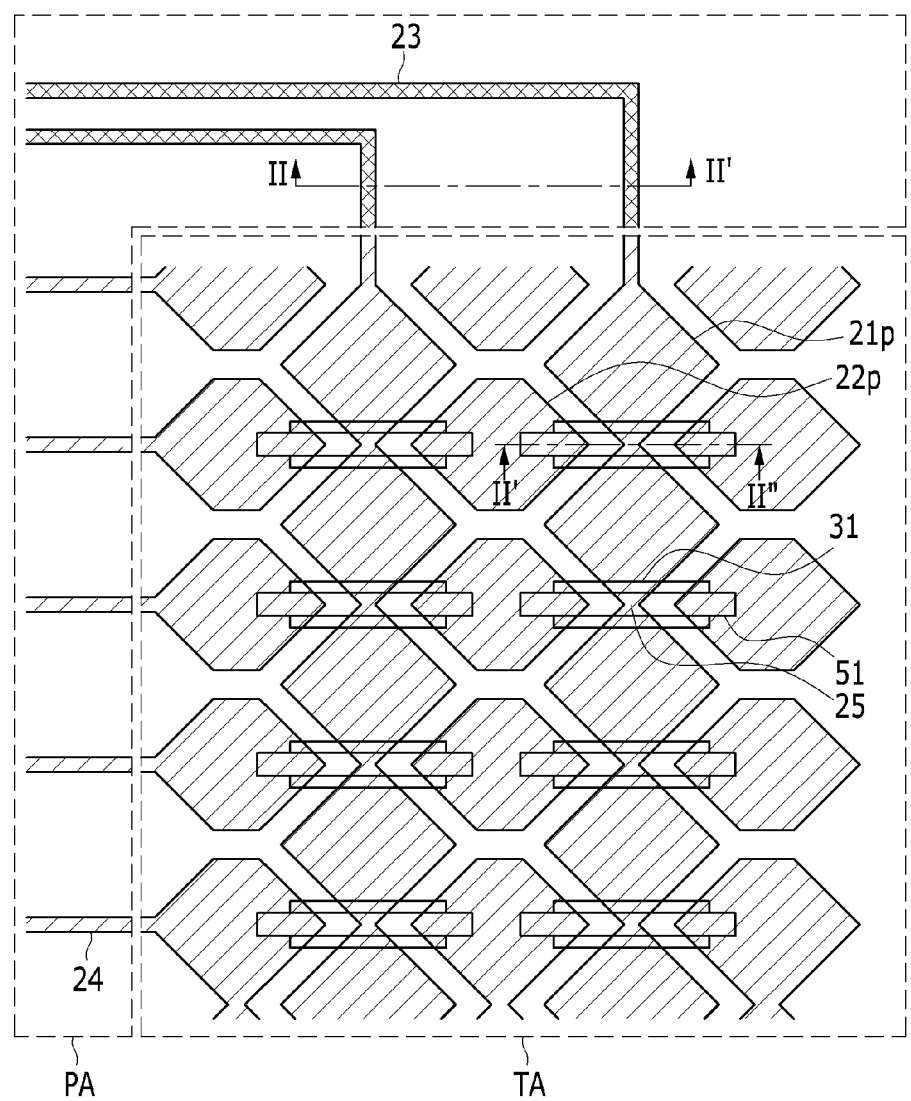
FIG. 1 is a layout view of a touch screen panel according to an exemplary embodiment.

Typical capacitive touch screen panels include a plurality of receiver (Rx) electrode patterns that are connected in a vertical direction and a plurality of transmitter (Tx) electrode patterns that are connected in a horizontal direction by a connecting line. Silver nanowire (AgNW), which has a high transmittance and low resistance, is being developed for use in these Tx and Rx electrode patterns. When formed of silver nanowire, Tx and Rx electrode patterns can be patterned and formed by wet etching or dry etching.

However, since the connecting line that connects adjacent Tx electrode patterns is typically formed of a transparent conductive oxide (TCO), an oxidant used for etching the transparent conductive layer is likely to also etch the silver nanowire (AgNW) forming the Tx and Rx electrode patterns. Accordingly, it is difficult to exclusively etch the connecting line without damaging the Tx and Rx electrode patterns.

In addition, when a driving circuit wire that connects the Tx and Rx electrode patterns to an external driving circuit is formed of the silver nanowire (AgNW) similar to the Tx and Rx electrode patterns, it is difficult to achieve an adequate conductivity for the driving circuit wire.

The present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure.

In order to elucidate the present disclosure, portions that are not related to the description will be omitted, and like reference numerals designate like elements throughout the specification. In addition, the sizes and thicknesses of each configuration shown in the drawings may be exaggerated for better understanding and ease of description, but the present disclosure is not limited thereto.

In the drawings, the thicknesses of some layers and regions may be exaggerated for the sake of clarity. It will be understood that when an element such as a layer, film, region, or substrate is referred to as being "on" another element, it can be directly on the other element or intervening elements may also be present. The term "substantially" as used in this disclosure can include the meanings of completely, almost completely, or to any significant degree in some applications and in accordance with the understanding of those skilled in the art.

A touch screen panel according to an exemplary embodiment will now be described in detail with reference to FIGS. 1 and 2.

Figure 2:
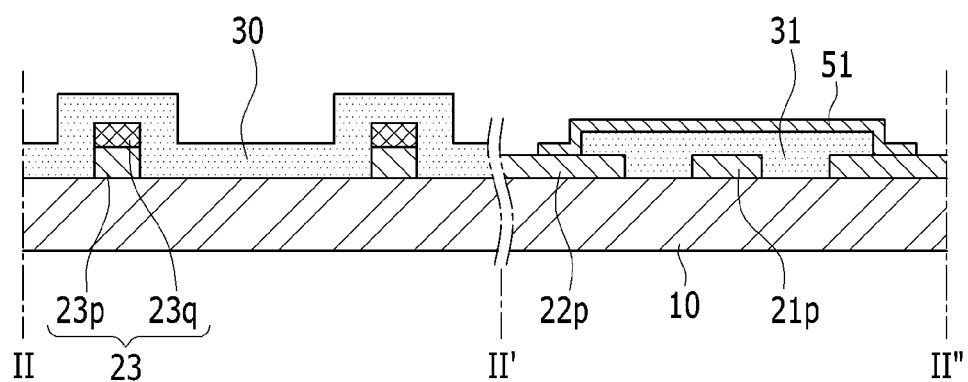
FIG. 2 is a cross-sectional view of the touch screen panel of FIG. 1 taken along the lines II-II' and II'-II".

FIG. 1 is a layout view of the touch screen panel and FIG. 2 is a cross-sectional view of the touch screen panel of FIG. 1 taken along the lines II-II' and II'-II".

As shown in FIGS. 1 and 2, the touch screen panel includes a substrate 10 having a touch area TA and a peripheral area PA that surrounds the touch area TA. The touch screen panel also includes a first touch electrode pattern 21 that is formed in the touch area TA, extends in a first direction, and transmits a first touch signal. A plurality of second touch electrode patterns 22 are also formed in the touch area TA, extend in a second direction crossing the first direction, and transmit a second touch signal. The touch screen panel further includes first driving circuit wiring 23 that is formed in the peripheral area PA and is electrically connected to the first touch electrode patterns 21 and second driving circuit wiring 24 that is formed in the peripheral area PA and is electrically connected to the second touch electrode patterns 22.

The substrate 10 may be an insulating substrate that is formed of glass, quartz, ceramic, or plastic. When attached to the top surface of a display device, the substrate 10 may be formed of a material having a superior transmittance.

The touch area TA refers to an area that senses the touch of a user and converts it into an electrical signal and the peripheral area PA refers to an area that does not include the first and second touch electrode patterns 21 and 22.

In some embodiments, the first touch electrode pattern 21 is a receiver (Rx) electrode pattern in which rhombus-shaped electrode patterns are interconnected in a first direction (e.g. a vertical direction) and through which a first touch signal for sensing an x-axis coordinate value is transmitted. These first touch electrode patterns 21 have a first touch overlapped portion or first connection portion 25 that interconnects the rhombus-shaped electrode patterns.

In some embodiments, the second touch electrode patterns 22 are spaced apart from each other and each of the second touch electrode patterns 22 has a rhombus-shaped electrode pattern. A connecting line 51 is formed to interconnect the adjacent second touch electrode patterns 22. In some embodiments, the second touch electrode patterns 22 form a transmitter (Tx) electrode pattern through which a second touch signal for sensing a y-axis coordinate value is transmitted.

The first and second touch electrode patterns 21 and 22 sense coordinate values of the user's touch and respectively transmit the coordinate values to an external driving circuit through the first and second driving circuit wiring 23 and 24, thereby producing the coordinate values as electrical signals.

The first touch electrode pattern 21 includes a transparent conductive wiring layer 21p, the second touch electrode pattern 22 includes a transparent conductive wiring layer 22p, and the first driving circuit wiring 23 includes a transparent conductive wiring layer 23p and a low resistance wiring layer 23q that are sequentially laminated. The transparent conductive wiring layers 21p, 22p, and 23p may contain silver nanowire (AgNW) and the low resistance wiring layer 23q may contain one material selected from copper and silver.

The first driving circuit wiring 23 is formed in the peripheral area and may be formed of the low resistance wiring layer 23q such as copper or silver having a low transmittance. As described above, the conductivity of the first driving circuit wiring 23 can be improved by forming the first driving circuit wiring 23 to include the low resistance wiring layer 23q in the peripheral area PA. The first driving circuit wiring 23 formed in the peripheral area PA is covered with an insulating layer 30 and a touch insulating member 31 is formed on the first touch overlapped portion 25 of the first touch electrode pattern 21 that is formed in the touch area TA.

The touch insulating member 31 is formed between the first touch electrode pattern 21 and the connecting line 51 to insulate the first touch electrode pattern 21 from the second touch electrode pattern 22. The connecting line 51 is formed on the touch insulating member 31 and contacts the second touch electrode pattern 22 such that it interconnects the separated second touch electrode patterns 22. The connecting line 51 may contain a transparent conductive oxide such as indium tin oxide (ITO), indium zinc oxide (IZO), zinc oxide (ZnO), or indium oxide ($In_2O_3$).

A method of manufacturing a touch screen panel according to an exemplary embodiment will now be described in detail with reference to the drawings.

FIGS. 3, 5, 7, and 9 are layout views sequentially illustrating a method of manufacturing a touch screen panel according to an exemplary embodiment. FIGS. 4, 6, 8, and 10 are respective cross-sectional views of the touch screen panel of FIGS. 3, 5, 7, and 9.

Figure 3:
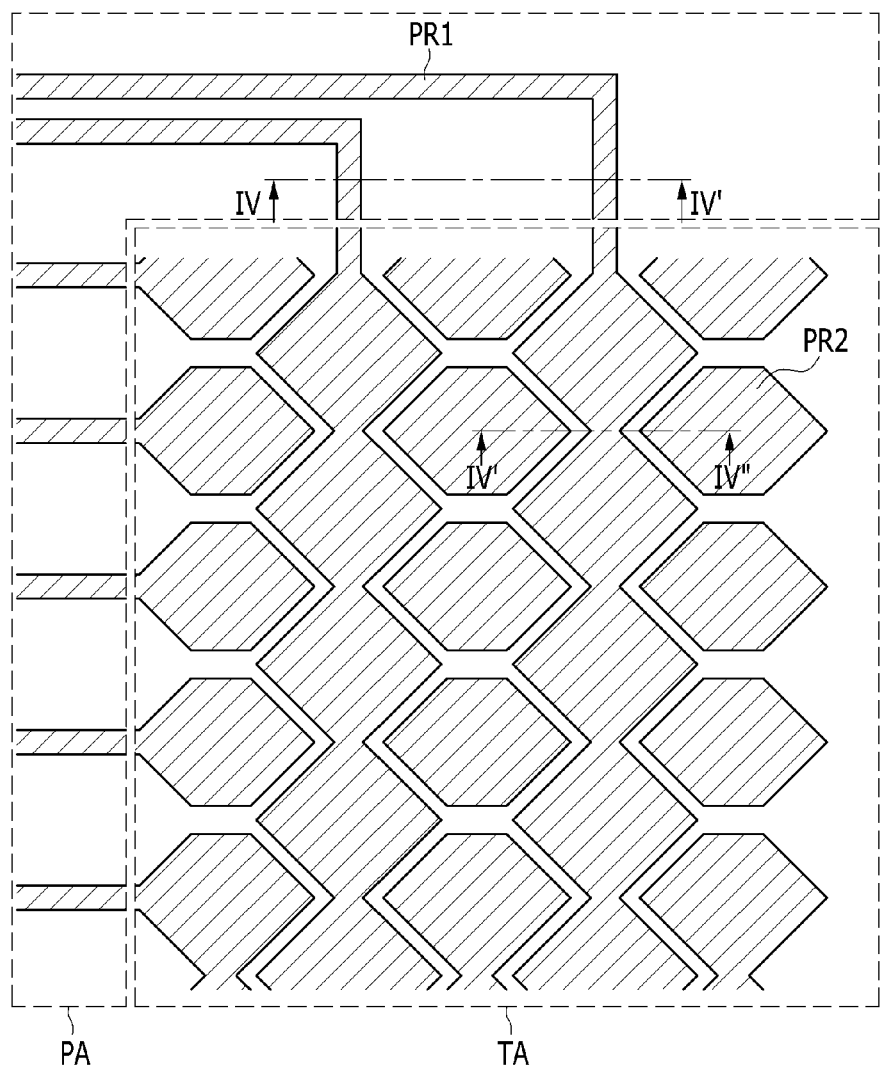
FIGS. 3, 5, 7, and 9 are layout views sequentially illustrating a method of manufacturing a touch screen panel according to an exemplary embodiment.
Figure 4:
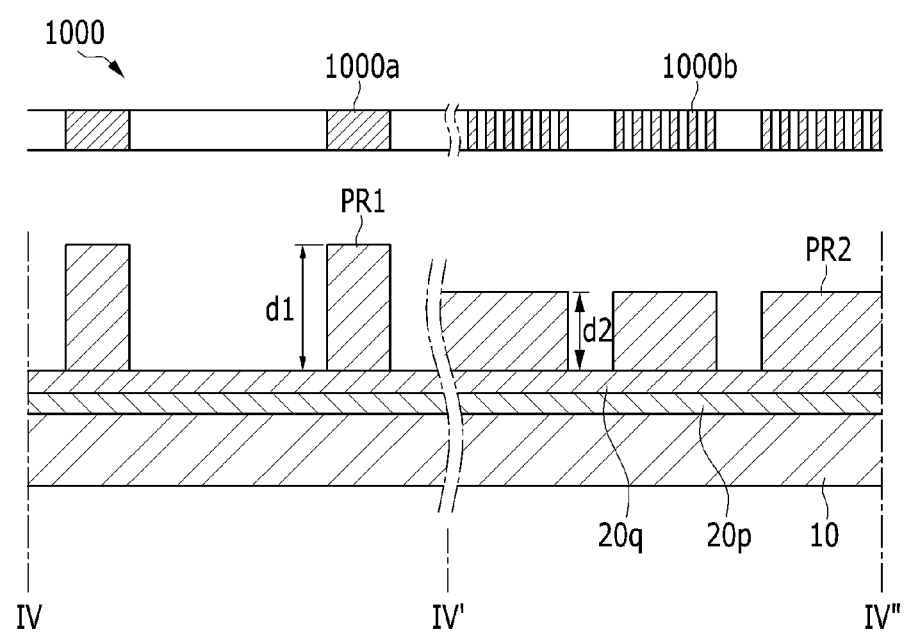
FIG. 4 is a cross-sectional view of the touch screen panel of FIG. 3 taken along the lines IV-IV' and IV'-IV".

Firstly, as shown in FIGS. 3 and 4, a transparent conductive layer 20p, a low resistance layer 20q, and a photosensitive film (PR1 and PR2) are sequentially formed on a substrate 10 having a touch area TA and a peripheral area PA. The transparent conductive layer 20p may contain silver nanowire (AgNW) and the low resistance layer 20q may contain one material selected from copper and silver.

Next, by patterning the photosensitive film (PR1 and PR2), a touch photosensitive film pattern PR2 is formed in the touch area TA while a peripheral photosensitive film pattern PR1 is formed in the peripheral area PA. By using a slit mask 1000, the thickness d2 of the touch photosensitive film pattern PR2 is formed to be less than the thickness d1 of the peripheral photosensitive film pattern PR1. To this end, a light blocking area 1000a of the slit mask 1000 is positioned over the peripheral area PA, while a slit area 1000b of the slit mask 1000 is positioned over the touch area TA.

Figure 5:
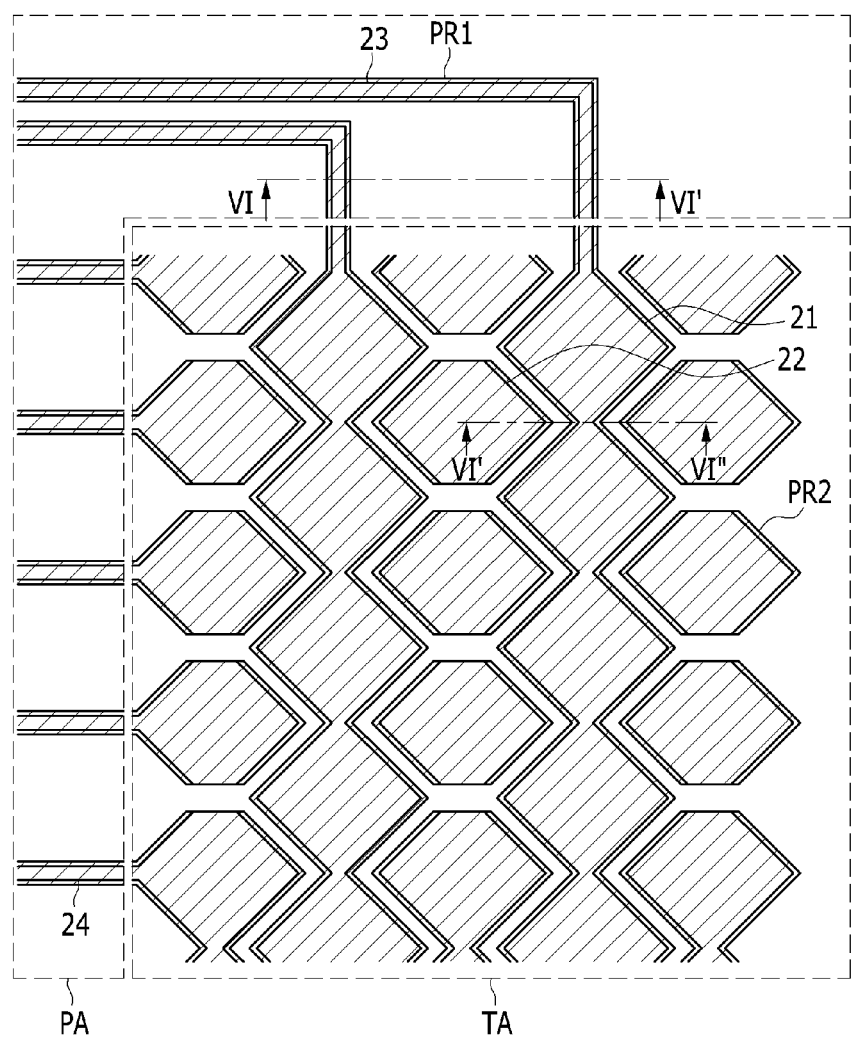
Figure 6:
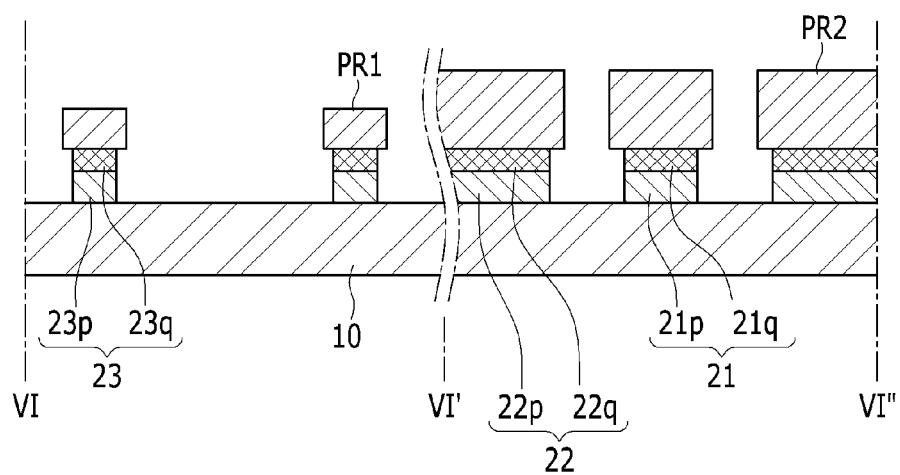
FIG. 6 is a cross-sectional view of the touch screen panel of FIG. 5 taken along the lines VI-VI' and VI'-VI".

Next, as shown in FIGS. 5 and 6, a first touch electrode pattern 21, a second touch electrode pattern 22, and first driving circuit wiring 23 are formed by using the touch and peripheral photosensitive film patterns PR2 and PR1 as etching masks.

Figure 7:
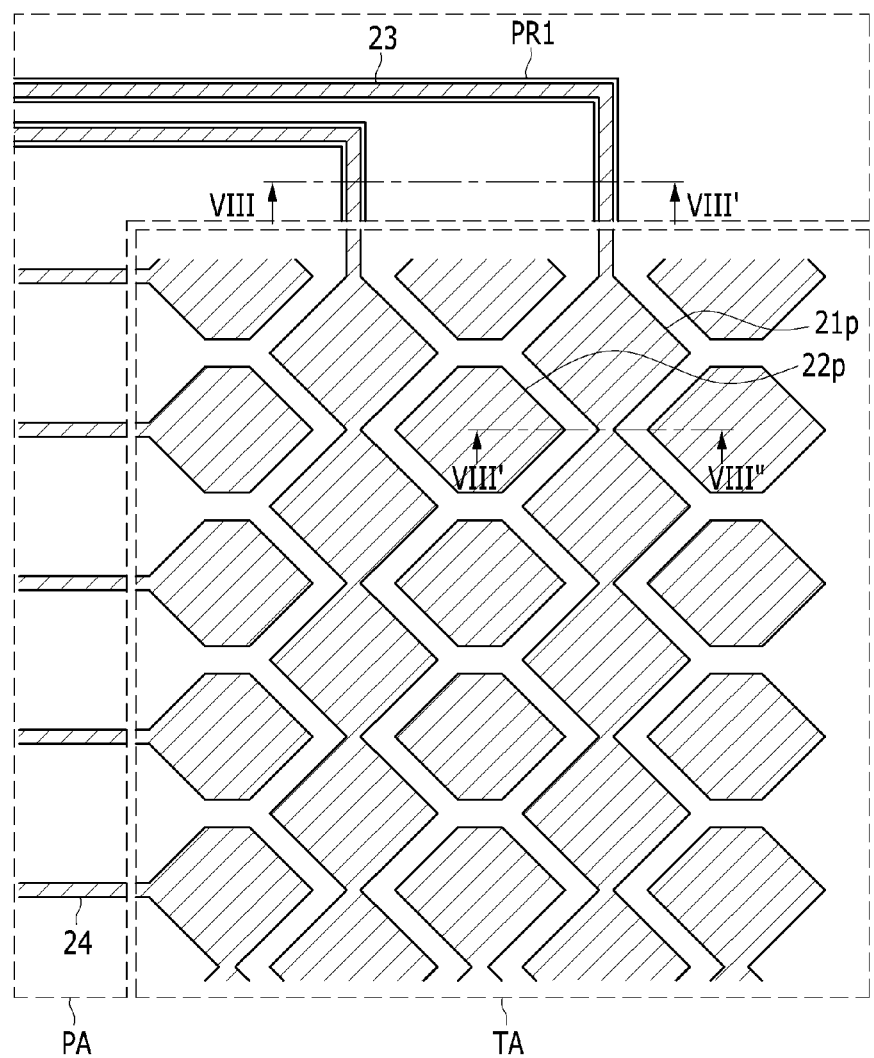
Figure 8:
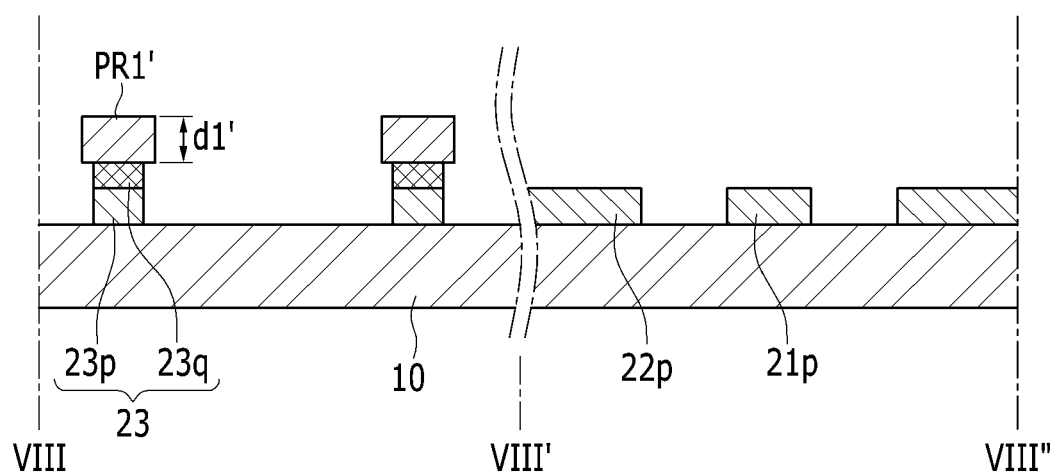
FIG. 8 is a cross-sectional view of the touch screen panel of FIG. 7 taken along the lines VIII-VIII' and VIII'-VIII".

Thereafter, as shown FIGS. 7 and 8, an ashing process is performed to reduce the thickness of the peripheral photosensitive film pattern PR1' and to remove the touch photosensitive film pattern PR2.

Accordingly, the thickness of the peripheral photosensitive film pattern PR1' is reduced to a thickness d1' and the first and second touch electrode patterns 21 and 22 that are formed in the touch area TA are exposed. Next, the low resistance wiring layers 21q and 22q of the first and second touch electrode patterns 21 and 22, which are formed in the touch area TA by the etching process, are removed. The low resistance wiring layers 21q and 22q are removed to improve the transmittance of the touch area TA since the low resistance wiring layers 21q and 22q have a low transmittance.

Since the first driving circuit wiring 23 formed in the peripheral area PA is covered with the peripheral photosensitive film pattern PR1', the low resistance wiring layer 23q of the first driving circuit wiring 23 is not removed during the etching process. Thus, the first and second touch electrode patterns 21 and 22 are respectively formed as a single layer including transparent conductive wiring layers 21p and 22p and the first driving circuit wiring 23 is formed to have a double layer having the transparent conductive wiring layer 23p and the low resistance wiring layer 23q.

Figure 9:
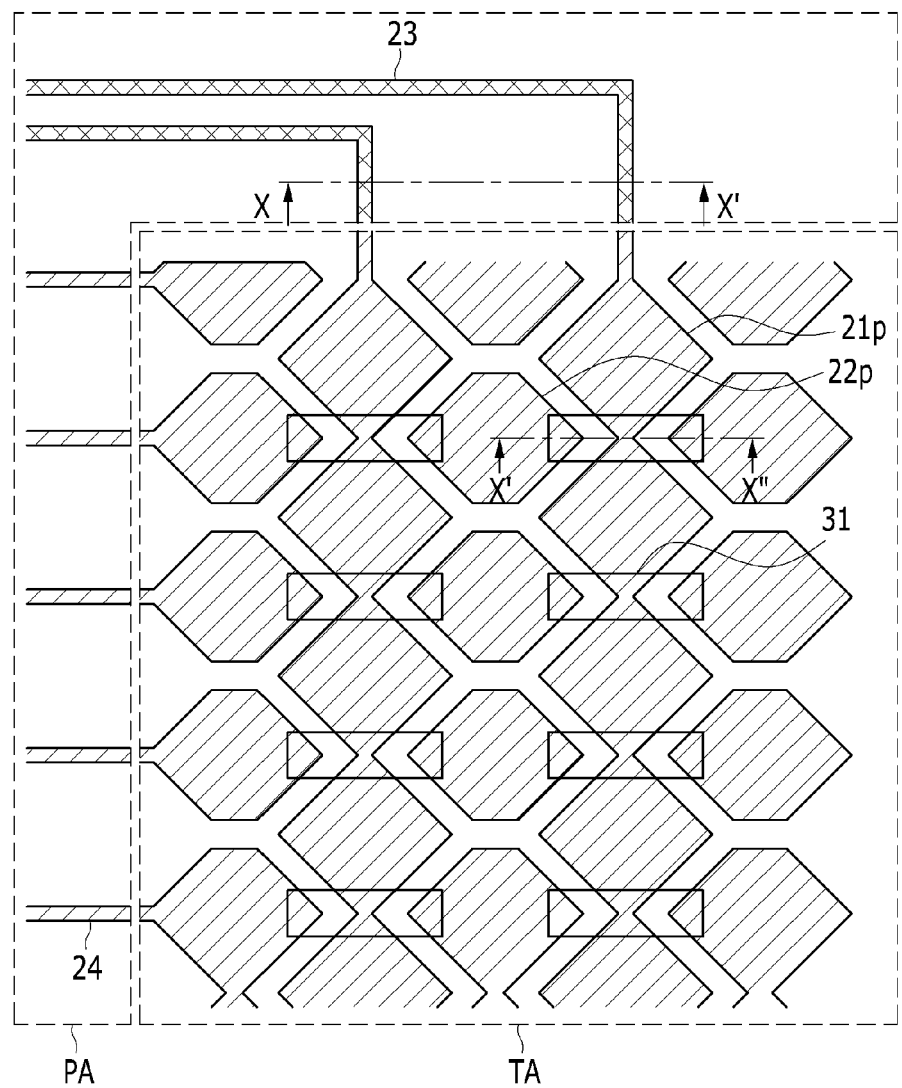
Figure 10:
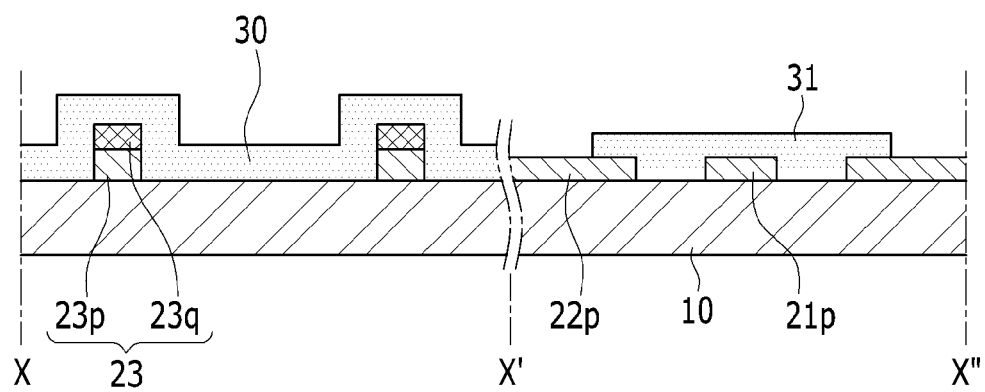
FIG. 10 is a cross-sectional view of the touch screen panel of FIG. 9 taken along the lines X-X' and X'-X".

Next, as shown in FIGS. 9 and 10, the peripheral photosensitive film pattern PR1' formed in the peripheral area PA is removed. Then, an insulating layer 30 is formed on the first driving circuit wiring 23, the first touch electrode pattern 21, and the second touch electrode pattern 22. The insulating layer 30 can be formed of a silicon nitride ($SiN_x$) or a silicon oxide ($SiO_2$) having a thickness of about 50 Å to about 500 Å.

Thereafter, by using a photolithography process, a touch insulating member 31 is formed on the first touch overlapped portion 25 of the first touch electrode pattern 21 by patterning the insulating layer 30 formed in the touch area TA.

Next, as shown in FIGS. 1 and 2, a connecting line 51 is formed on the touch insulating member 31 and the second touch electrode pattern 22 by using a transparent conductive oxide such as indium tin oxide (ITO), indium zinc oxide (IZO), zinc oxide (ZnO), or indium oxide ($In_2O_3$). The connecting line 51 contacts the second touch electrode patterns 22 such that it interconnects the separated second touch electrode patterns 22.

Meanwhile, in the exemplary embodiment described above, since an oxidant for etching the connecting line 51 generally etches the silver nanowire (AgNW) forming the first and second touch electrode patterns 21p and 22p, it is difficult to exclusively etch the connecting line without damaging the first and second touch electrode patterns 21p and 22p. In another exemplary embodiment, the connecting line 51 is exclusively etched without damaging the first and second touch electrode patterns.

Figure 11:
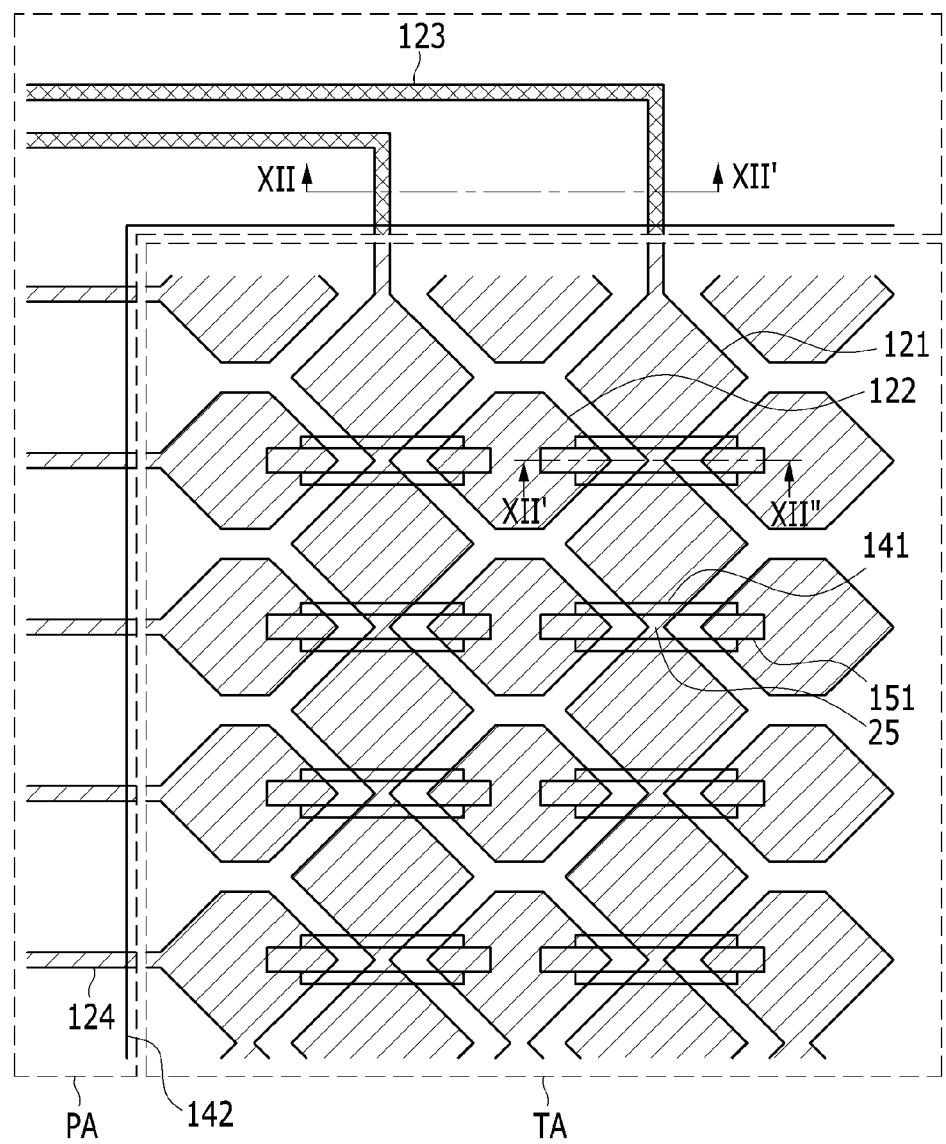
FIG. 11 is a layout view of a touch screen panel according to another exemplary embodiment.
Figure 12:
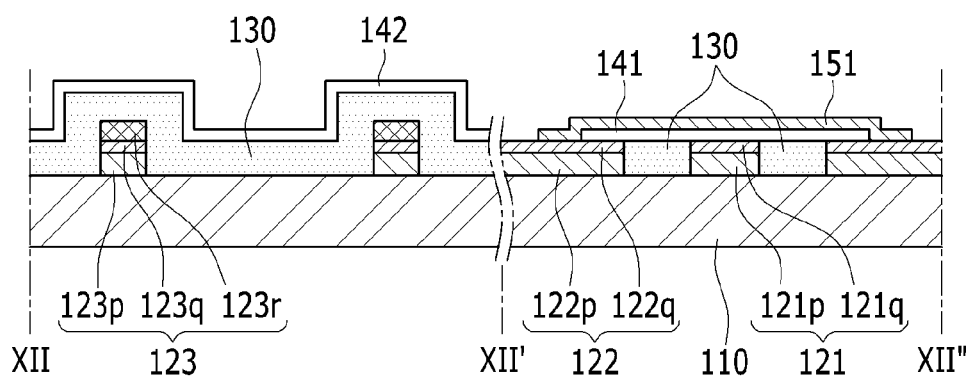
FIG. 12 is a cross-sectional view of the touch screen panel of FIG. 11 taken along the lines XII-XII' and XII'-XII".

FIG. 11 is a layout view of a touch screen panel according to another exemplary embodiment and FIG. 12 is a cross-sectional view of the touch screen panel of FIG. 11 taken along the lines XII-XII' and XII'-XII".

As shown in FIGS. 11 and 12, the touch screen panel includes a substrate 110 having a touch area TA and a peripheral area PA that surrounds the touch area TA. The touch screen panel also includes a first touch electrode pattern 121 that is formed in the touch area TA, extends in a first direction, and transmits a first touch signal. A plurality of second touch electrode patterns 122 are formed on the touch area TA, extend in a second direction crossing the first direction, and transmit a second touch signal. The touch screen panel further includes first driving circuit wiring 123 that is formed in the peripheral area PA and is electrically connected to the first touch electrode pattern 121 and second driving circuit wiring 124 that is formed in the peripheral area PA and is electrically connected to the second touch electrode pattern 122.

The substrate 110 may be an insulating substrate that is formed of glass, quartz, ceramic, or plastic. When attached to the top surface of a display device, the substrate 110 may be formed of a material having a superior transmittance.

The touch area TA refers to an area that senses a user's touch and converts it into an electrical signal and the peripheral area refers to an area that does not include the first and second touch electrode patterns 121 and 122.

In some embodiments, the first touch electrode pattern 121 is a receiver electrode pattern in which rhombus-shaped electrode patterns are interconnected in a first direction (e.g. a vertical direction) and through which a first touch signal for sensing a x-axis coordinate value is transmitted. These first touch electrode patterns 121 have a first touch overlapped portion 25 that interconnects the rhombus-shaped electrode patterns.

In some embodiments, the second touch electrode patterns 122 are spaced apart from each other and each of the second touch electrode patterns 122 has a rhombus-shaped electrode pattern. A connecting line 151 is formed to interconnect the adjacent second touch electrode patterns 122. In some embodiments, the second touch electrode patterns 122 form a transmitter electrode pattern through which a second touch signal for sensing a y-axis coordinate value is transmitted.

The first and second touch electrode patterns 121 and 122 sense coordinate values of the user's touch and respectively transmit the coordinate values to an external driving circuit through the first and second driving circuit wiring 123 and 124, thereby producing the coordinate values as electrical signals.

The first touch electrode pattern 121 includes a first transparent conductive wiring layer 121$p$ and a second transparent conductive wiring layer 121$q$ that are sequentially laminated, the second touch electrode pattern 122 includes a first transparent conductive wiring layer 122$p$ and a second transparent conductive wiring layer 122$q$ that are sequentially laminated, and the first driving circuit wiring 123 includes a first transparent conductive wiring layer 123$p$, a second transparent conductive wiring layer 123$q$, and a low resistance wiring layer 123$r$ that are sequentially laminated.

The first transparent conductive wiring layers 121$p$, 122$p$, and 123$p$ may contain silver nanowire (AgNW), the second transparent conductive wiring layers 121$q$, 122$q$, and 123$q$ contain a transparent conductive oxide such as indium tin oxide (ITO), indium zinc oxide (IZO), zinc oxide (ZnO), or indium oxide (In$_2$O$_3$), and low resistance wiring layers 121$r$, 122$r$, and 123$r$ may contain one material selected from copper and silver.

The first driving circuit wiring 123 is formed in the peripheral area and may be formed of the low resistance wiring layer 123$r$ such as copper or silver having a low transmittance. As described above, the conductivity of the first driving circuit wiring 123 can be improved by forming the first driving circuit wiring 123 to include the low resistance wiring layer 123$r$ in the peripheral area PA. The first driving circuit wiring 123 formed in the peripheral area PA is covered with an insulating layer 130 and the insulating layer 130 is formed on the exposed substrate 110 between the first and second touch electrode patterns 121 and 122 that are formed in the touch area TA. That is, the insulating layer 130 is not formed on the first and second electrode patterns 121 and 122.

A peripheral insulating member 142 is formed on the insulating layer 130 that is formed in the peripheral area PA and a touch insulating member 141 is formed on the first touch overlapped portion 25 of the first touch electrode pattern 121. The touch insulating member 141 is formed between the first touch electrode pattern 121 and the connecting line 151 to insulate the first touch electrode pattern 121 from the second touch electrode pattern 122.

The connecting line 151 formed on the touch insulating member 141 and contacts the second transparent conductive wiring layer 122$q$ of the second touch electrode pattern 122 such that it interconnects the separated second touch electrode patterns 122. The connecting line 151 may contain a transparent conductive oxide such as indium tin oxide (ITO), indium zinc oxide (IZO), zinc oxide (ZnO), or indium oxide (In$_2$O$_3$).

The etching rate of the connecting line 151 may be higher than that of the second transparent conductive wiring layers 121$q$ and 122$q$. Accordingly, the connecting line 151 can be exclusively etched without damaging the second transparent wiring layers 121$q$ and 122$q$ that are formed on the first and second touch electrode patterns 121 and 122.

To this end, in some embodiments, the connecting line 151 have a higher indium content than the second transparent conductive wiring layers 121$q$ and 122$q$. The indium content of the connecting line 151 may be about 90% to about 95%, while the indium content of the second transparent conductive wiring layers 121$q$ and 122$q$ may be about 1% to about 50%.

A method of manufacturing a touch screen panel according to another exemplary embodiment will now be described in detail with reference to the drawings.

FIGS. 13, 15, 17, 19, 21, and 23 are layout views sequentially illustrating a method of manufacturing a touch screen panel according to another exemplary embodiment. FIGS. 14, 16, 18, 20, 22, and 24 are respective cross-sectional views of the touch screen panel of FIGS. 13, 15, 17, 19, 21, and 23.

Figure 13:
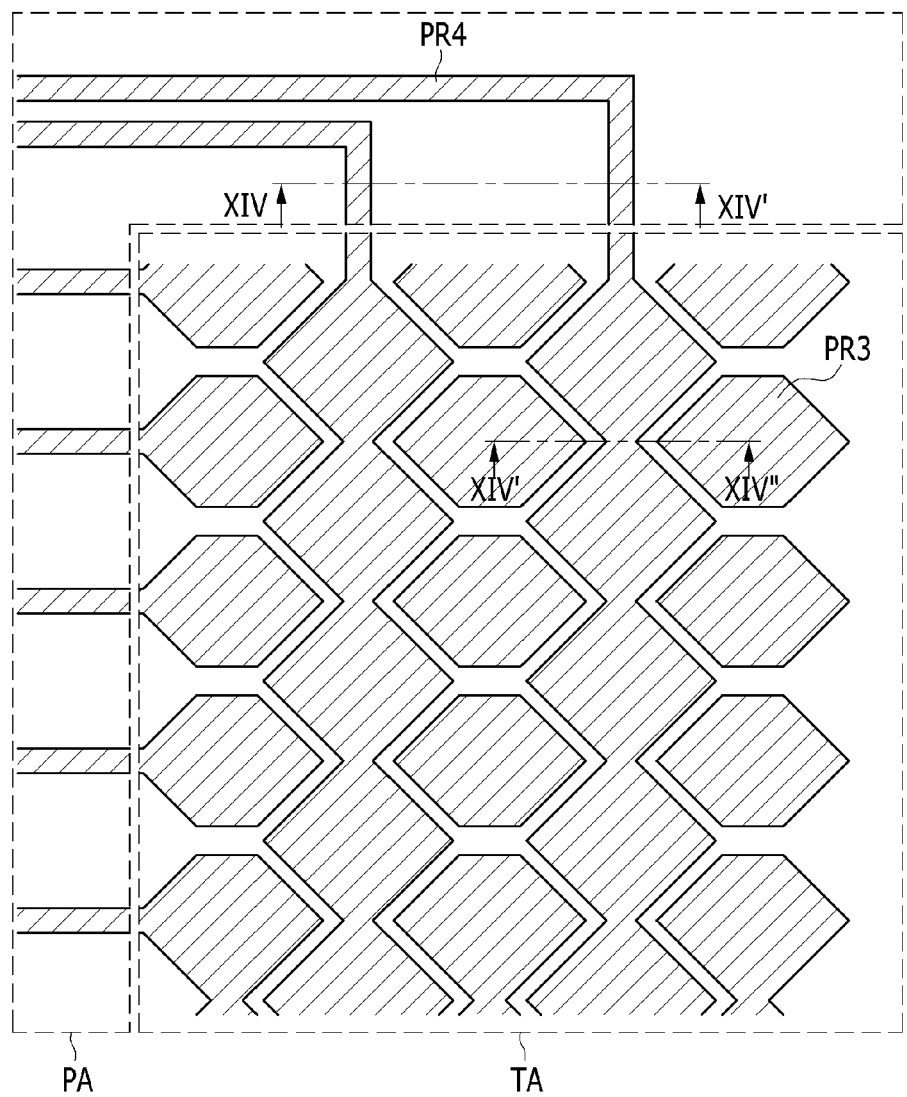
FIGS. 13, 15, 17, 19, 21, and 23 are layout views sequentially illustrating a method of manufacturing a touch screen panel according to another exemplary embodiment.
Figure 14:
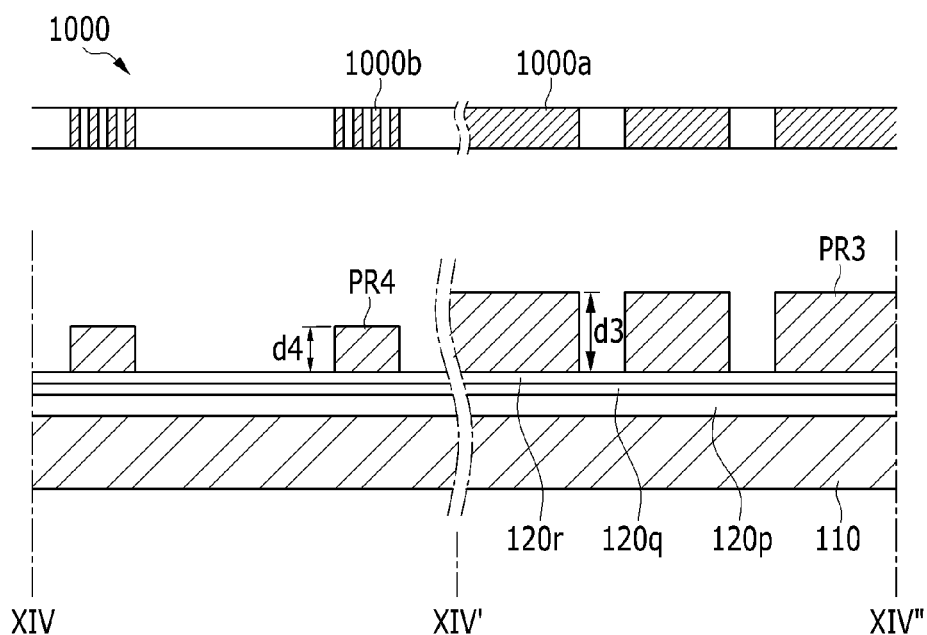
FIG. 14 is a cross-sectional view of the touch screen panel of FIG. 13 taken along the lines XIV-XIV' and XIV'-XIV".

Firstly, as shown in FIGS. 13 and 14, a first transparent conductive layer 120$p$, a second transparent conductive layer 120$q$, a low resistance layer 120$r$, and a photosensitive film (PR3 and PR4) are sequentially formed on a substrate 110 having a touch area TA and a peripheral area PA.

The first transparent conductive layer 120$p$ may contain silver nanowire (AgNW), the second transparent conductive 120$q$ may contain a transparent conductive oxide such as indium tin oxide (ITO), indium zinc oxide (IZO), zinc oxide (ZnO), or indium oxide (In$_2$O$_3$), and the low resistance layer 120$r$ may contain one material selected from copper and silver.

Next, by patterning the photosensitive film (PR3 and PR4), a touch photosensitive film pattern PR3 is formed in the touch area TA and a peripheral photosensitive film pattern PR4 is formed in the peripheral area PA. By using a slit mask 1000, the peripheral photosensitive film pattern PR4 is formed to have a thickness d4 that is less than a thickness d3 of the touch photosensitive film pattern PR3. To this end, a light blocking area 1000$a$ of the slit mask 1000 is positioned in the touch area TA and a slit area 1000$b$ of the slit mask 1000 is positioned in the peripheral area TA.

Figure 15:
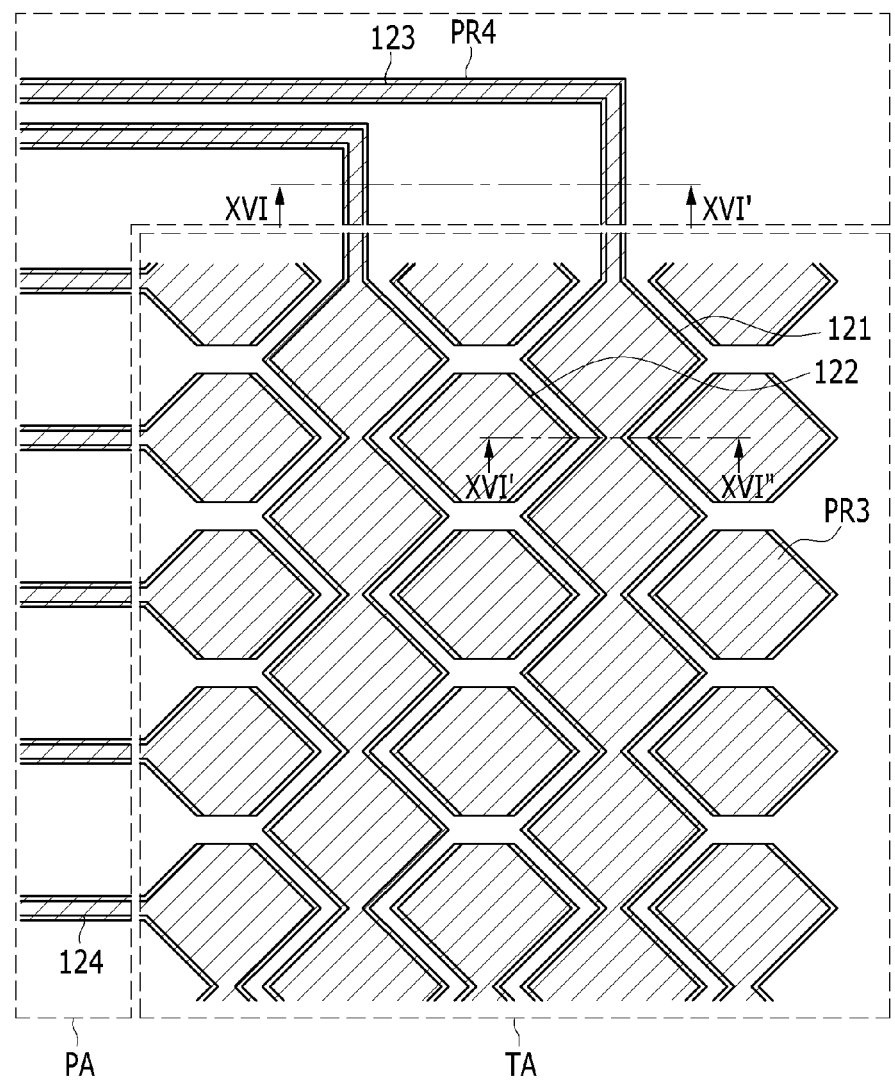
Figure 16:
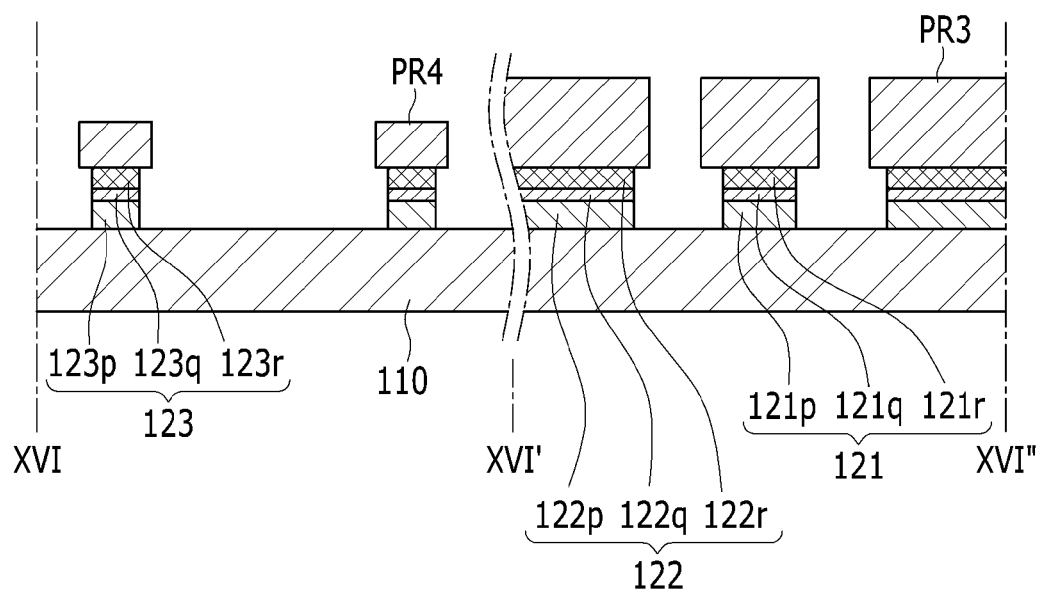
FIG. 16 is a cross-sectional view of the touch screen panel of FIG. 15 taken along the lines XVI-XVI' and XVI'-XVI".

Next, as shown in FIGS. 15 and 16, a first touch electrode pattern 121, a second touch electrode pattern 122, and first driving circuit wiring 123 are formed by using the touch and peripheral photosensitive film patterns PR3 and PR4 as etching masks.

Figure 17:
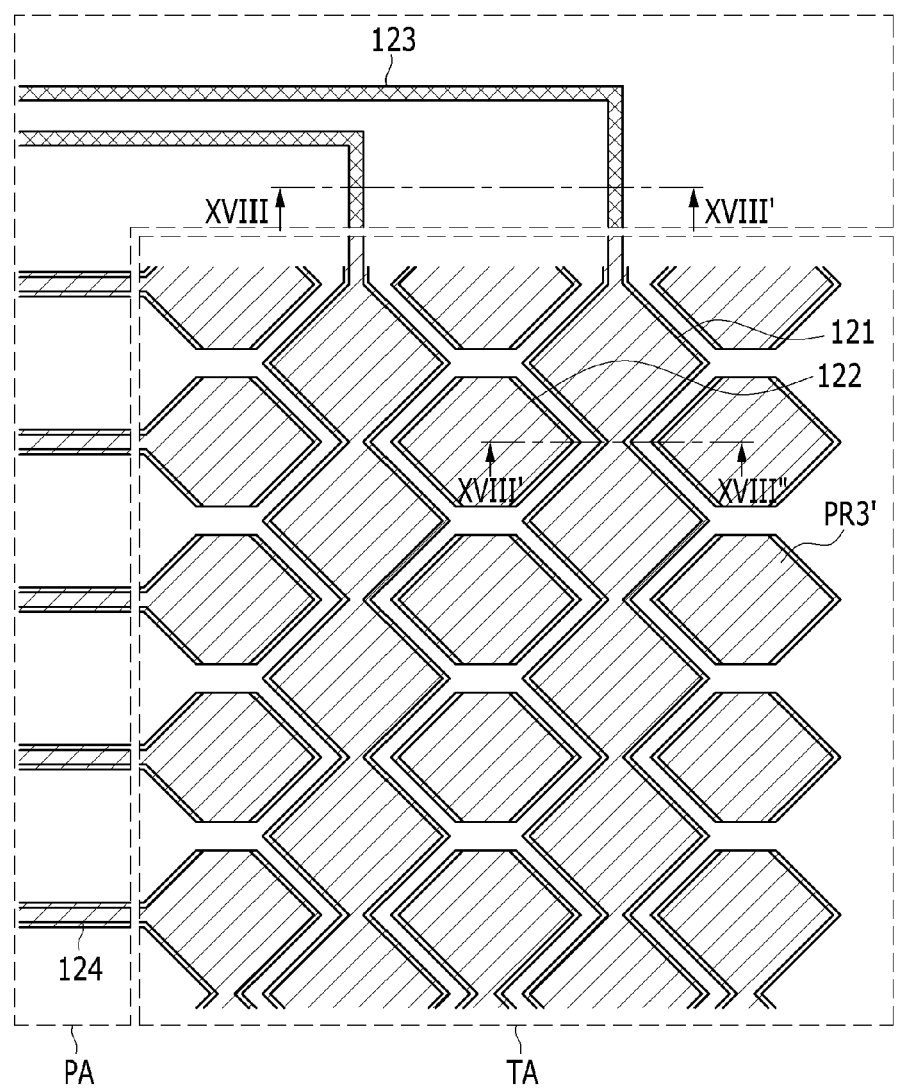
Figure 18:
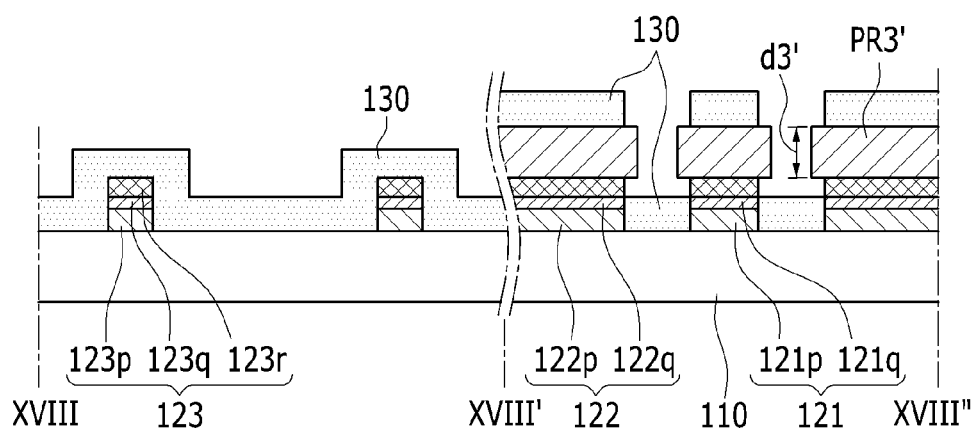
FIG. 18 is a cross-sectional view of the touch screen panel of FIG. 17 taken along the lines XVIII-XVIII' and XVIII'-XVIII".

Next, as shown FIGS. 17 and 18, an ashing process is performed to reduce the thickness of the touch photosensitive film pattern PR3 and to remove the peripheral photosensitive film pattern PR4. Thus, the thickness of the touch photosensitive film pattern PR3' is reduced to a thickness d3' and the first driving circuit wiring 123 formed in the peripheral area PA is exposed.

Next, an insulating layer 130 is formed on the first driving circuit wiring 123 and the touch photosensitive film pattern PR3' that are exposed. Since the insulating layer 130 formed in the touch area TA has a step between the touch photosensitive film pattern PR3' and the substrate 110, the insulating layer 130 formed between the first and second touch electrode patterns 121 and 122 is separated from the insulating layer 130 that is formed on the touch photosensitive film pattern PR3'. The insulating layer 130 is formed of a silicon nitride ($SiN_x$) or a silicon oxide ($SiO_2$) to a thickness of about 50 Å to about 500 Å.

Figure 19:
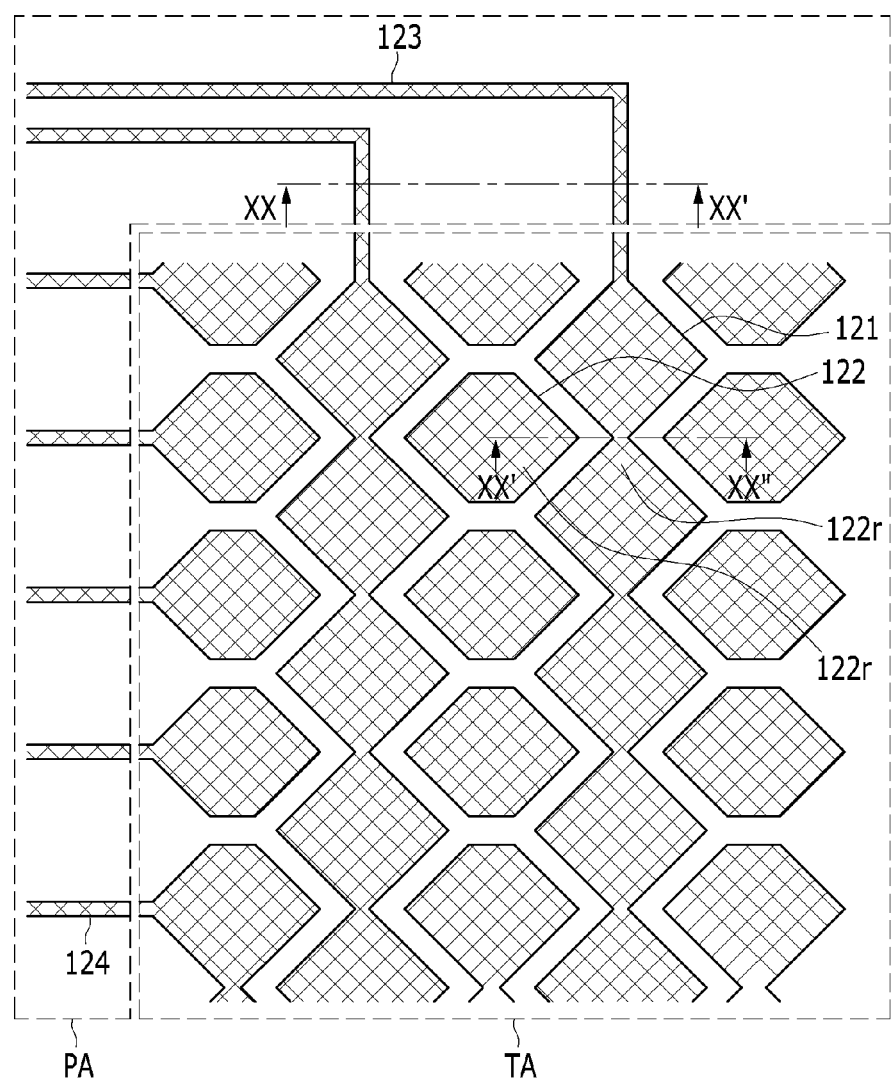
Figure 20:
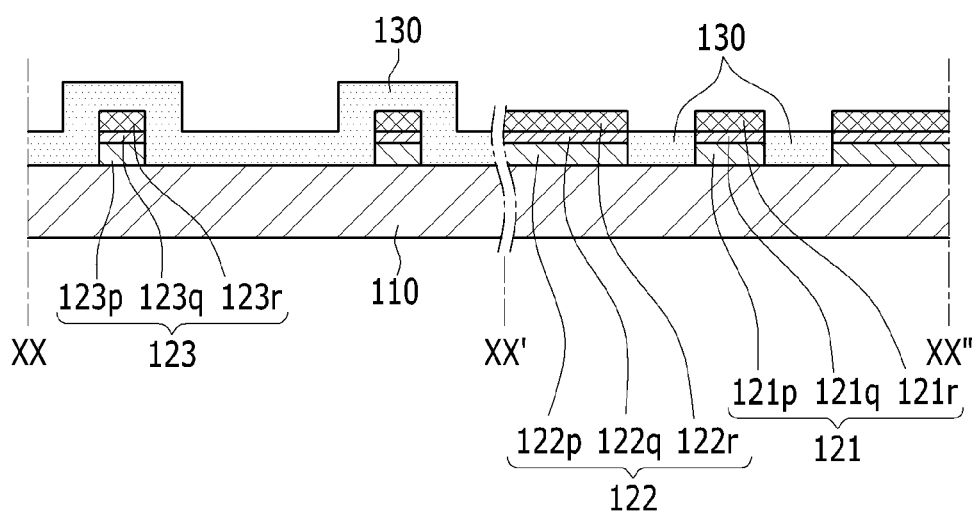
FIG. 20 is a cross-sectional view of the touch screen panel of FIG. 19 taken along the lines XX-XX' and XX'-XX".

Next, as shown in FIGS. 19 and 20, by removing the touch photosensitive film pattern PR3', a lift-off process is performed to simultaneously remove the insulating layer 130 that is formed on the touch photosensitive film pattern PR3'. Thereafter, the first and second touch electrode patterns 121 and 122 are exposed, but the top surface of the first transparent conductive wiring layers 121p and 122p are protected from the lift-off process because they are respectively covered by the second transparent conductive wiring layers 121q and 122q and the low resistance wiring layers 121r and 122r and the lateral sides of the first transparent conductive wiring layers 121p and 122p are protected from the lift-off process because they are covered with the insulating layer 130.

Figure 21:
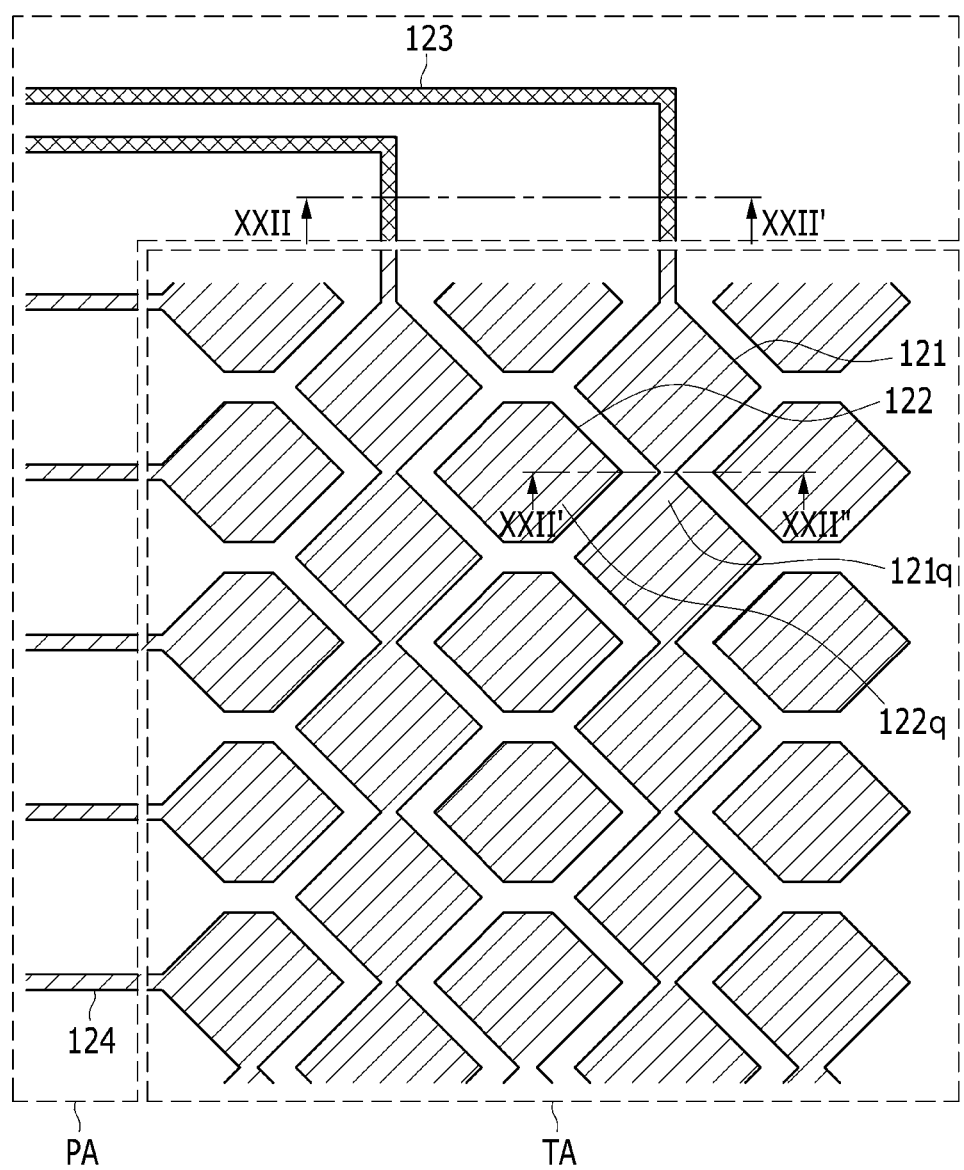
Figure 22:
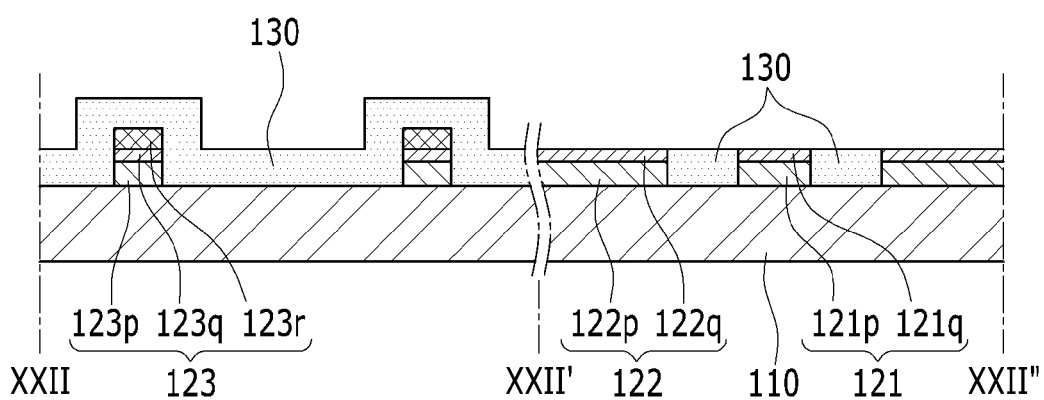
FIG. 22 is a cross-sectional view of the touch screen panel of FIG. 21 taken along the lines XXII-XXII' and XXII'-XXII".

Next, as shown in FIGS. 21 and 22, the low resistance wiring layers 121r and 122r are removed from the first and second touch electrode patterns 121 and 122 in the touch area TA. The low resistance wiring layers 121r and 122r are removed to improve the transmittance of the touch area TA since low resistance wiring layers 121r and 122r have a low transmittance.

Accordingly, the first and second touch electrode patterns 121 and 122 are completed and include the first transparent wiring layers 121p and 122p and the second transparent wiring layers 121q and 122q. Similarly, and the first driving circuit wiring 123 is completed and includes the first transparent conductive wiring layer 123p, the second transparent conductive wiring layer 123q, and the low resistance wiring layer 123r.

Figure 23:
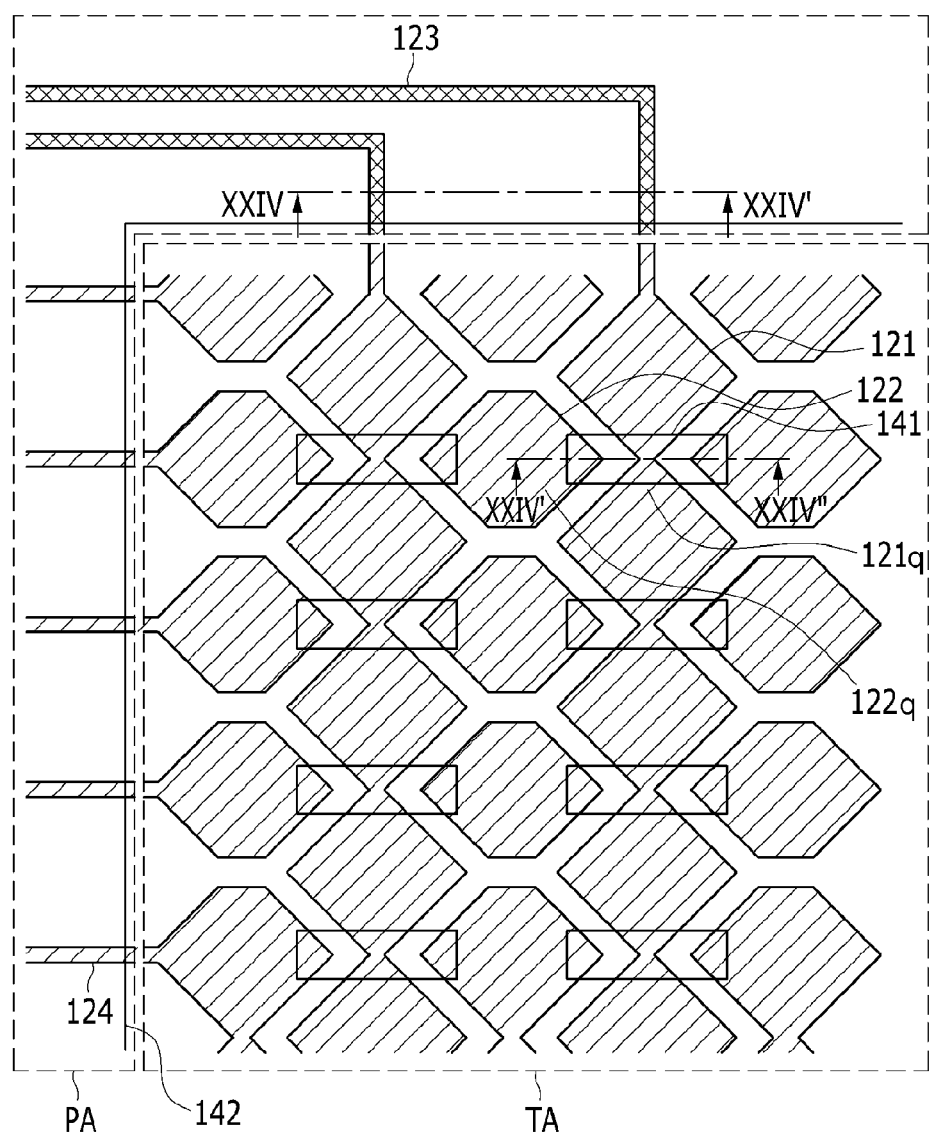
Figure 24:
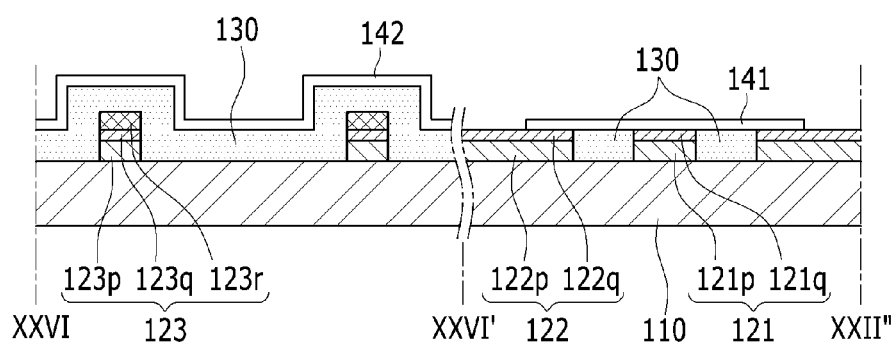
FIG. 24 is a cross-sectional view of the touch screen of FIG. 23 taken along the lines XXIV-XXIV' and XXIV'-XXIV".

Next, as shown in FIGS. 23 and 24, a peripheral insulating member 142 is formed on the insulating layer 130 and a touch insulating member 141 is formed on the second touch electrode pattern 122. The peripheral and touch insulating members 142 and 141 are simultaneously formed with the same material. The peripheral and touch insulating members 142 and 141 can be formed of a material such as a silicon nitride ($SiN_x$) or a silicon oxide ($SiO_2$). In addition, the insulating layer 130, the peripheral insulating material 142, and the touch insulating member 141 can be formed of the same material.

Next, as shown in FIGS. 11 and 12, a connecting line 151 is formed on the touch insulating member 141 and the first touch electrode pattern 121 using a transparent conductive oxide. The connecting line 151 contacts the second transparent conductive wiring layer 122q of the second touch electrode pattern 122 such that it interconnects the separated second touch electrode patterns 122.

According to some embodiments, the etching rate of the connecting line 151 may be greater than that of the second transparent conductive wiring layers 121q and 122q. Accordingly, the connecting line 151 can be exclusively etched without damaging the second transparent wiring layers 121q and 122q above the first and second touch electrode patterns 121 and 122 in a patterning process of the connecting line 151. To this end, the connecting line 151 may have a higher indium content than the second transparent conductive wiring layers 121q and 122q.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A touch screen panel, comprising:
a substrate having a touch area and a peripheral area that surrounds the touch area;
a plurality of first touch electrode patterns that are disposed in the touch area, extend in a first direction, and are configured to transmit a first touch signal;
a plurality of second touch electrode patterns that are disposed in the touch area, extend in a second direction crossing the first direction, and are configured to transmit a second touch signal; and
a plurality of first driving circuit wirings that are disposed in the peripheral area and are respectively electrically connected to the first touch electrode patterns,
wherein the first driving circuit wirings include a transparent conductive wiring layer and a low resistance wiring layer disposed on the transparent conductive wiring layer, and
wherein the first touch electrode patterns, the second touch electrode patterns and the transparent conductive wiring layer are formed of the same material containing silver nanowire.

2. The panel of claim 1, wherein the second touch electrode patterns are spaced apart from each other and wherein the panel further comprises a plurality of connecting lines electrically connecting the second touch electrode patterns that are adjacent in the second direction.

3. The panel of claim 2, further comprising a plurality of touch insulating members that are respectively disposed between the first touch electrode patterns and the connecting lines and electrically insulate the first touch electrode patterns from the second touch electrode patterns.

4. The panel of claim 3, wherein the first driving circuit wirings include a first transparent conductive wiring layer, a second transparent conductive wiring layer, and the low resistance wiring layer that are sequentially disposed and wherein the first and second touch electrode patterns respectively include the first and second transparent conductive wiring layers.

5. The panel of claim 4, wherein the first transparent conductive wiring layer contains silver nanowire and wherein the second transparent conductive wiring layer and the connecting line contain a transparent conductive oxide.

6. The panel of claim 5, wherein the low resistance wiring layer is formed of copper or silver.

7. The panel of claim 5, wherein the connecting lines have an etching rate that is greater than that of the second transparent conductive wiring layer.

8. The panel of claim 7, wherein the connecting lines have a higher indium content than the second transparent conductive wiring layer.

9. The panel of claim 4, wherein an insulating layer and a peripheral insulating member are sequentially laminated on the first driving circuit wirings.

10. The panel of claim 9, wherein the insulating layer is disposed between the first and second touch electrode patterns.

11. The panel of claim 4, wherein the touch insulating members and the connecting lines are sequentially and respectively disposed over first connection portions of the first touch electrode patterns.

12. The panel of claim 4, wherein the connecting lines contact the second transparent conductive wiring layers of the second touch electrode patterns.

13. A method of manufacturing a touch screen panel, comprising:
sequentially forming a first transparent conductive layer, a second transparent conductive layer, a low resistance layer, and a photosensitive film over a substrate, the substrate having a touch area and a peripheral area that surrounds the touch area;
forming a touch photosensitive film pattern in the touch area and a peripheral photosensitive film pattern in the peripheral area;
etching the first transparent conductive layer, the second transparent conductive layer, and the low resistance layer using the touch and peripheral photosensitive film patterns as etching masks so as to form a first touch electrode pattern, a second touch electrode pattern, and a first driving circuit wiring;
performing an ashing process so as to remove the peripheral photosensitive film layer and reduce the thickness of the touch photosensitive film pattern;
forming an insulating layer over the first driving circuit wiring and the touch photosensitive film pattern;
removing the touch photosensitive film pattern and the insulating layer disposed thereon; and
removing the low resistance layers of the first and second touch electrode patterns,
wherein the first touch electrode pattern, the second touch electrode pattern and the first transparent conductive layer are formed of the same material containing silver nanowire.

14. The method of claim 13, wherein each of the first and second touch electrode patterns includes a first transparent conductive wiring layer and a second transparent conductive wiring layer and wherein the first driving circuit wiring includes a first transparent conductive wiring layer, a second transparent conductive wiring layer, and a low resistance wiring layer.

15. The method of claim 14, further comprising:
forming a peripheral insulating member over the insulating layer in the peripheral region and a touch insulating member over the first touch electrode pattern, after removing the low resistance layer; and
forming a connecting line over the touch insulating member so as to be electrically connected to the second touch electrode pattern.

16. The method of claim 15, wherein the insulating layer is disposed between the first and second touch electrode patterns.

17. The method of claim 16, wherein, during the removing the touch photosensitive film pattern, the low resistance wiring layers of the first and second touch electrode patterns are exposed and lateral sides of the first transparent conductive wiring layer of the first and second touch electrode patterns are covered by the insulating layer.

18. The method of claim 15, wherein the thickness of the peripheral photosensitive film pattern is less than that of the touch photosensitive film pattern and wherein the peripheral photosensitive film pattern is formed by using a slit mask.

19. The method of claim 15, wherein the first transparent conductive layer contains silver nanowire, wherein the second transparent conductive layer contains a transparent conductive oxide, and wherein the low resistance layer is formed of copper or silver.

20. A touch screen panel, comprising:
a substrate having a touch area and a peripheral area surrounding the touch area;
a plurality of first touch electrode patterns disposed in the touch area and extending in a first direction;
a plurality of second touch electrode patterns disposed in the touch area and extending in a second direction crossing the first direction, wherein the first and second touch electrode patterns are configured to sense touch input; and
a plurality of driving circuit wirings disposed in the peripheral area and respectively electrically connected to the first and second touch electrode patterns,
wherein the first and second touch electrode patterns and the driving circuit wirings include a first transparent conductive wiring layer and a second transparent conductive wiring layer disposed on the first transparent conductive wiring layer,
wherein the driving circuit wirings further include a low resistance wiring layer, and
wherein the first touch electrode patterns, the second touch electrode patterns and the first transparent conductive wiring layer are formed of the same material containing silver nanowire.

* * * * *